(12) United States Patent
Tsujino (10) Patent No.: US 11,870,657 B2
(45) Date of Patent: Jan. 9, 2024

(54) NETWORK DESIGN APPARATUS, NETWORK DESIGN METHOD AND PROGRAM

(71) Applicant: NIPPON TELEGRAPH AND TELEPHONE CORPORATION, Tokyo (JP)

(72) Inventor: Masayuki Tsujino, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/753,009

(22) PCT Filed: Sep. 5, 2019

(86) PCT No.: PCT/JP2019/035048
§ 371 (c)(1),
(2) Date: Feb. 15, 2022

(87) PCT Pub. No.: WO2021/044596
PCT Pub. Date: Mar. 11, 2021

(65) Prior Publication Data
US 2022/0271998 A1    Aug. 25, 2022

(51) Int. Cl.
*H04L 41/14*    (2022.01)
*H04L 41/0826*    (2022.01)

(52) U.S. Cl.
CPC ........ *H04L 41/145* (2013.01); *H04L 41/0826* (2013.01)

(58) Field of Classification Search
CPC ............... H04L 41/145; H04L 41/0826; H04L 41/0896; H04L 43/0876; H04L 41/14
See application file for complete search history.

(56) References Cited

U.S. PATENT DOCUMENTS

| | | | | |
|---|---|---|---|---|
| 2005/0069314 | A1* | 3/2005 | De Patre | H04J 14/0241 398/5 |
| 2009/0270106 | A1* | 10/2009 | Matsunaga | H04W 36/22 455/445 |

(Continued)

OTHER PUBLICATIONS

Michael Pioro and Deepankar Medhi , Routing, Flow, Capacity Design in Communication and Computer Networks, 2004 (Year: 2004).*

(Continued)

*Primary Examiner* — John A Follansbee
*Assistant Examiner* — Fadi Haj Said
(74) *Attorney, Agent, or Firm* — IPUSA, PLLC (57) ABSTRACT

A network design apparatus for designing a network includes a processor; and a memory storing program instructions that cause the processor to receive input of a configuration condition for a network having a communication layer and at least one computing layer, a cost condition for the network, and a demand condition representing uncertain demand for the network, perform an operation for solving an adjustable robust optimization problem in which an objective function is to minimize a sum of a fixed cost and a variable cost for a resource placed at each base in the communication layer and the computing layer, and determine a configuration of the network based on placement and capacity of a resource obtained by the performing of the operation. The demand condition includes a set of one or more bases from which the resource is assignable in response to the demand.

14 Claims, 7 Drawing Sheets

(56) References Cited

U.S. PATENT DOCUMENTS

| | | | |
|---|---|---|---|
| 2012/0066371 A1* | 3/2012 | Patel | H04L 67/1031 |
| | | | 709/224 |
| 2013/0159045 A1* | 6/2013 | Ettl | G06Q 10/087 |
| | | | 705/7.25 |
| 2017/0295109 A1* | 10/2017 | Byers | H04Q 1/00 |
| 2020/0021515 A1* | 1/2020 | Michael | H04L 43/0864 |

OTHER PUBLICATIONS

Michal Pioro and Deepankar Medhi, "Routing, Flow, and Capacity Design in Communication and Computer Networks", Morgan Kaufmann Publishers, Jul. 1, 2004.

Thomas Bauschert et al., "Network planning under demand uncertainty with robust optimization", IEEE Communications Magazine vol. 52, No. 2, 2014, pp. 178-185.

Kei Takeshita et al., "Optimal Server Allocation Method including Network Design Problem", Institute of Electronics, Information and Communication Engineers Society Conference, vol. 2010, No. 2, 2010.

Masayuki Tsujino, "Robust Optimization Model for Designing Emerging Cloud-Fog Networks", BCD 2019—4th International Conference on Big Data, Cloud Computing, and Data Science Engineering, May 29, 2019.

M. Taneja and A. Davy, "Resource aware placement of IoT application modules in fog-cloud Computing Paradigm," 2017 IFIP/IEEE Symposium on Integrated Network and Service Management (IM), pp. 1222-1228, 2017.

* cited by examiner

| BASE | DEMAND VARIABLE | AVERAGE | MAXIMUM |
|---|---|---|---|
| 1 | $d^{(1)}$ | $\bar{d}^{(1)}$ | $\bar{d}^{(1)} + \tilde{d}^{(1)}$ |
| 2 | $d^{(2)}$ | $\bar{d}^{(2)}$ | $\bar{d}^{(2)} + \tilde{d}^{(2)}$ |
| ... | | | |

PARAMETER $\Gamma \geq 0$

SET D REPRESENTING UNCERTAIN DEMANDS $$D := \left\{ d^{(k)} \mid \bar{d}^{(k)} \leq d^{(k)} \leq \bar{d}^{(k)} + \tilde{d}^{(k)}, k \in K; \sum_{k \in K} \frac{d^{(k)} - \bar{d}^{(k)}}{\tilde{d}^{(k)}} \leq \Gamma \right\}$$

⇒ THIS IDEA OF UNCERTAINTY SET IS CALLED "Γ-ROBUSTNESS"

Fig. 5

| DEMAND OCCURRENC | BASES WHERE FOG CAN BE ASSIGNED |
|---|---|
| 1 | 2, 5 |
| 2 | 1, 3, 5, 6 |
| ... | ... |

Fig. 6

| Parameter | Description |
|---|---|
| $G=\{N, A\}$ | Target communication network |
| $N$ | Set of network nodes |
| $N_{gw}$ | Set of network nodes where IoT gateways are placed, $N_{gw} \subseteq N$ |
| $N_{fg}$ | Set of network nodes where fog computers can be placed, $N_{fg} \subseteq N$ |
| $A$ | Set of network links |
| $b_{lk}^{(a)}$ | Fixed design cost at link $a \in A$ |
| $c_{lk}^{(a)}$ | Traffic-dependent unit cost at link $a \in A$ |
| $b_{fg}^{(n)}$ | Fixed design cost for placing fog computers at node $n \in N_{fg}$ |
| $c_{fg}^{(n)}$ | Workload-dependent unit cost for assigning fog computers at node $n \in N_{fg}$ |
| $K$ | Set of demands for assigning fog computers |
| $gw^{(k)}$ | Source node for demand $k \in K$ |
| $N_{fg}^{(k)}$ | Set of nodes that can be assigned for each demand of fog computers $k$, $N_{fg}^{(k)} \subseteq N_{fg}$ |
| $h^{(k)}$ | Proportional factor of workload for demand $k \in K$ |
| $\bar{d}^{(k)}$ | Average traffic for demand $k \in K$ |
| $\tilde{d}^{(k)}$ | Maximum deviation from average traffic for demand $k \in K$ |
| $\Gamma$ | Robustness-level parameter |

Fig. 7

| Variable | Description | |
|---|---|---|
| $x_{lk}^{(a)}$ | Capacity of transmission-link equipment installed at link $a \in A$ | DECISION VARIABLES REGARDING CAPACITY |
| $x_{fg}^{(n)}$ | Capacity of fog computers installed at fog node $n \in N_{fg}$ | |
| $y_{lk}^{(k,a)}(d)$ | Rate of demand assigned to link $a \in A$ out of $k \in K$, which is dependent of generated demands, $d = \{d^{(k)} \in K\}$ | DECISION VARIABLES REGARDING ASSIGNMENT (WHICH DEPEND ON DEMAND) |
| $y_{fg}^{(k,n)}(d)$ | Rate of demand assigned to fog node $n \in N_{fg}$ out of $k \in K$, which is dependent of generated demands, $d = \{d^{(k)} \in K\}$ | |
| $z_{lk}^{(a)}$ | Whether link $a \in A$ is placed | DECISION VARIABLES REGARDING PLACEMENT |
| $z_{fg}^{(n)}$ | Whether fog computers are installed at fog node $n \in N_{fg}$ | |
| $d^{(k)}$ | Volume for demand $k \in K$ | VARIABLES REPRESENTING UNCERTAIN DEMAND |

Fig. 8

NETWORK DESIGN APPARATUS, NETWORK DESIGN METHOD AND PROGRAM

TECHNICAL FIELD

The present invention relates to network design, and particularly relates to determination of placement and capacity of resources such as fog computers and communication links in a network used for an IoT infrastructure.

BACKGROUND ART

IoT has become widespread in recent years. Since placement of computing functions in a communication network influences a flow of traffic on the communication network, it is meaningful to integrally handling design regarding computers and communication links as an IoT infrastructure when economically building an IoT infrastructure.

CITATION LIST

Non-Patent Literature

Non-Patent Literature 1: M. Pioro and D. Medhi, "Routing, Flow and Capacity Design in Communication and Computer Networks," Morgan Kaufmann Publishers, 2004.

Non-Patent Literature 2: T. Bauschert, C. Busing, F. D'Andreagiovanni, A. C. A. Koster, M. Kutschka, and U. Steglich, "Network planning under demand uncertainty with robust optimization," IEEE Commun. Mag., vol. 52, no. 2, pp. 178-185, 2014.

Non-Patent Literature 3: Takeshita Kei, Shiozu Hiroaki, Tsujino Masayuki, and Hasegawa Haruhisa, "An Optimal Server-Allocation Method with Network Design Problem," the Institute of Electronics, Information and Communication Engineers, Society Conference, vol. 2010, no. 2, pp. 93, 2010.

Non-Patent Literature 4: M. Tsujino, "Robust Optimization Model for Designing Emerging Cloud-Fog Networks," BCD 2019-4th International Conference on Big Data, Cloud Computing, and Data Science Engineering, May 29-31, 2019.

SUMMARY OF THE INVENTION

Technical Problem

Although future demand is used in network design, it is extremely difficult to predict future demand for an IoT service, which is highly innovative, so it is necessary to make a design in consideration of a certain degree of uncertainty in demand, rather than on the premise that values can be obtained deterministically for IoT demand prediction.

On the other hand, since virtual networks and environments where computing resources can be assigned dynamically have also been getting ready by virtue of software techniques such as SDN (software defined network), adjustable assignment of resources should also be considered for a fluctuation in uncertain demand in the future to design a network. However, network design techniques based on conventional robust optimization schemes have a problem that adjustable assignment of resources cannot be considered.

The present invention has been made in view of the above points, and aims to provide a technique that enables capacity design and placement design in a network consisting of a plurality of layers to be performed in consideration of uncertain demand and adjustable assignment of resources.

Means for Solving the Problem

According to the disclosed technique, there is provided a network design apparatus for designing a network, comprising:
an input unit that receives input of a configuration condition for a network having a communication layer and at least one computing layer, a cost condition for the network, and a demand condition representing uncertain demand for the network;
an operation unit that performs an operation for solving an adjustable robust optimization problem in which an objective function is to minimize a sum of a fixed cost and a variable cost for a resource placed at each base in the communication layer and the computing layer; and
an output unit that outputs placement and capacity of a resource obtained by the operation unit,
wherein the adjustable robust optimization problem has a constraint condition using a variable indicating a ratio of, in a case where demand is assigned to a resource, a portion assigned to the resource with respect to total volume of the demand, and the variable is a variable that depends on a set of generated demands.

Effects of the Invention

According to the disclosed technique, there is provided a technique that enables capacity design and placement design in a network consisting of a plurality of layers to be performed in consideration of uncertain demand and adjustable assignment of resources.

DESCRIPTION OF EMBODIMENTS

An embodiment of the present invention will be described with reference to the drawings below. The embodiment described below is merely an example, and embodiments to which the present invention is applied are not limited to the embodiment below.

Although the embodiment below is targeted for a network that consists of a fog layer and a communication layer and is used as an IoT infrastructure, the present invention can be applied without being limited to such a network. For example, the present invention can also be applied to a network consisting of a cloud layer, a fog layer, and a communication layer that is described in Non-Patent Literature 4. Note that both of the cloud layer and the fog layer are examples of a computing layer.

Further, it is also possible to apply the present invention to a network having at least one computing layer and a communication layer that can be used for purposes other than IoT as well.

Example of Apparatus Configuration

Figure 1:
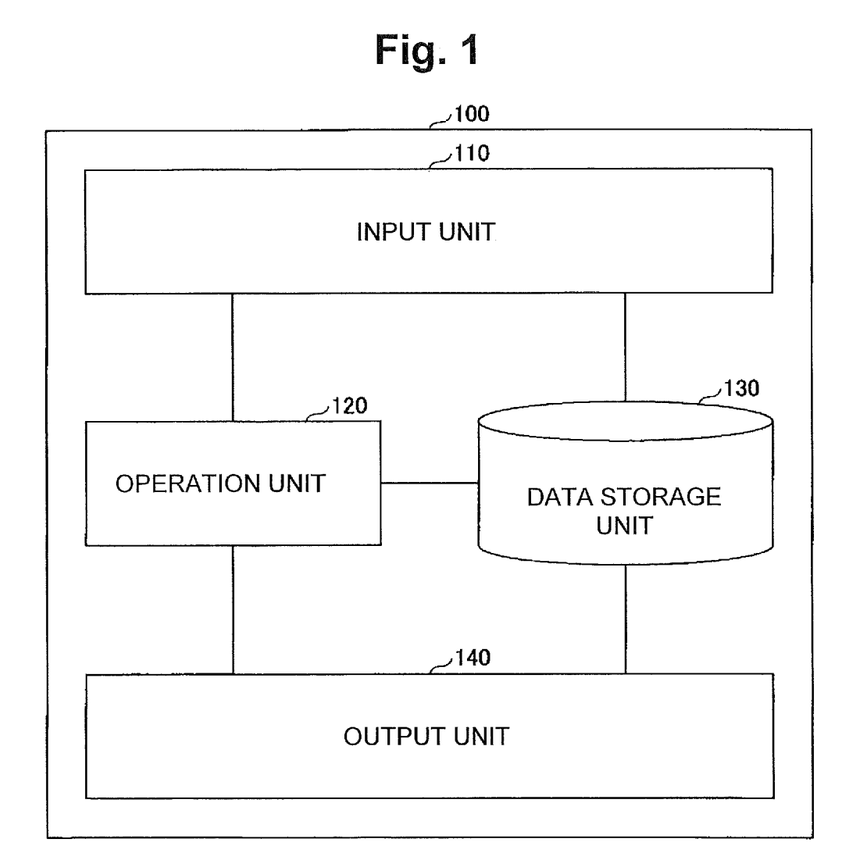
FIG. 1 is a functional configuration diagram of a network design apparatus 100 in an embodiment of the present invention.

FIG. 1 is a functional configuration diagram of a network design apparatus 100 in an embodiment of the present invention. As shown in FIG. 1, the network design apparatus 100 has an input unit 110, an operation unit 120, a data storage unit 130, and an output unit 140.

The input unit 110 receives input of a network configuration condition, a cost condition, a demand condition, and the like. The operation unit 120 performs calculation for solving an adjustable robust optimization problem. The content of processing by the operation unit 120 will be described later in detail.

Input data, parameters required in solving the optimization problem, data in the process of calculation in solving the optimization problem, data for output, and the like are stored in the data storage unit 130.

The output unit 140 outputs placement and capacity of computers, placement and capacity of communication links, and the like that are a result of solving the optimization problem.

The network design apparatus 100 can be implemented by, for example, causing a computer to execute a program in which the processing content described in this embodiment is written. Note that this "computer" may be a virtual machine. When a virtual machine is used, "hardware" described here is virtual hardware. Further, the program may be, for example, an optimization solver that is a program in which an algorithm for solving the adjustable robust optimization problem is written. That is, for example, the adjustable robust optimization problem in this embodiment is solved by the optimization solver being executed by the computer.

The network design apparatus 100 can be implemented by executing a program corresponding to processing performed by the network design apparatus 100 using hardware resources such as a CPU or a memory built in the computer. The above program can be recorded on a computer-readable recording medium (such as a portable memory) to be stored or distributed. Further, the above program can be provided through a network, such as over the Internet or by e-mail.

Figure 2:
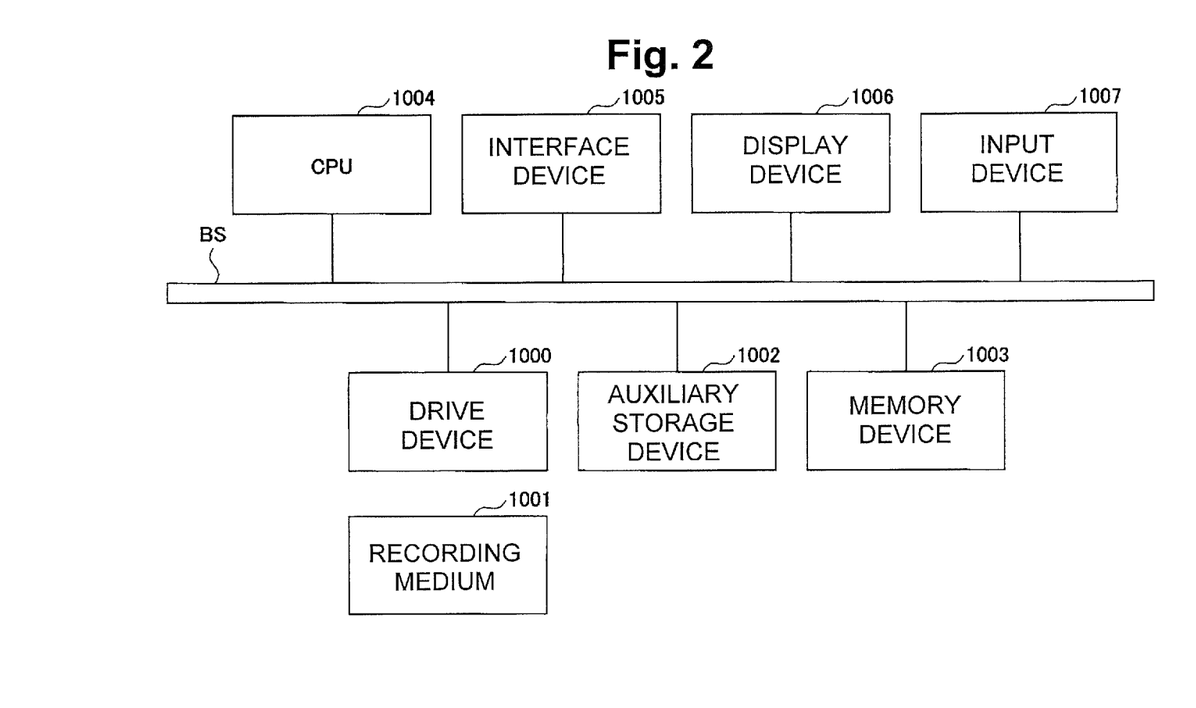
FIG. 2 is a diagram showing an example hardware configuration of the network design apparatus 100.

FIG. 2 is a diagram showing an example hardware configuration of the above computer. The computer in FIG. 2 has a drive device 1000, an auxiliary storage device 1002, a memory device 1003, a CPU 1004, an interface device 1005, a display device 1006, an input device 1007, and the like that are connected to one another via a bus B.

The program for implementing the processing on the computer is provided via a recording medium 1001 such as a CD-ROM or a memory card. When the recording medium 1001 storing the program is set in the drive device 1000, the program is installed in the auxiliary storage device 1002 from the recording medium 1001 via the drive device 1000. However, the program need not necessarily installed via the recording medium 1001, it may be downloaded from another computer via the network. The auxiliary storage device 1002 stores the installed program, as well as storing required files, data, and the like.

Upon an instruction to start the program, the memory device 1003 reads out the program from the auxiliary storage device 1002 for storage. The CPU 1004 implements functions related to the network design apparatus 100 according to the program stored in the memory device 1003. The interface device 1005 is used as an interface for connecting to the network. The display device 1006 displays a GUI (graphical user interface) or the like based on the program. The input device 1007 consists of a keyboard and mouse, buttons, a touch panel, or the like, and is used for allowing input of various operation instructions.

The operation of the network design apparatus 100 (i.e., the processing content for designing a network) will be described below.

(Operation Overview of Network Design Apparatus 100)

First, the network design apparatus 100 receives input of the network configuration condition, the cost condition, and the demand condition.

Figure 3:
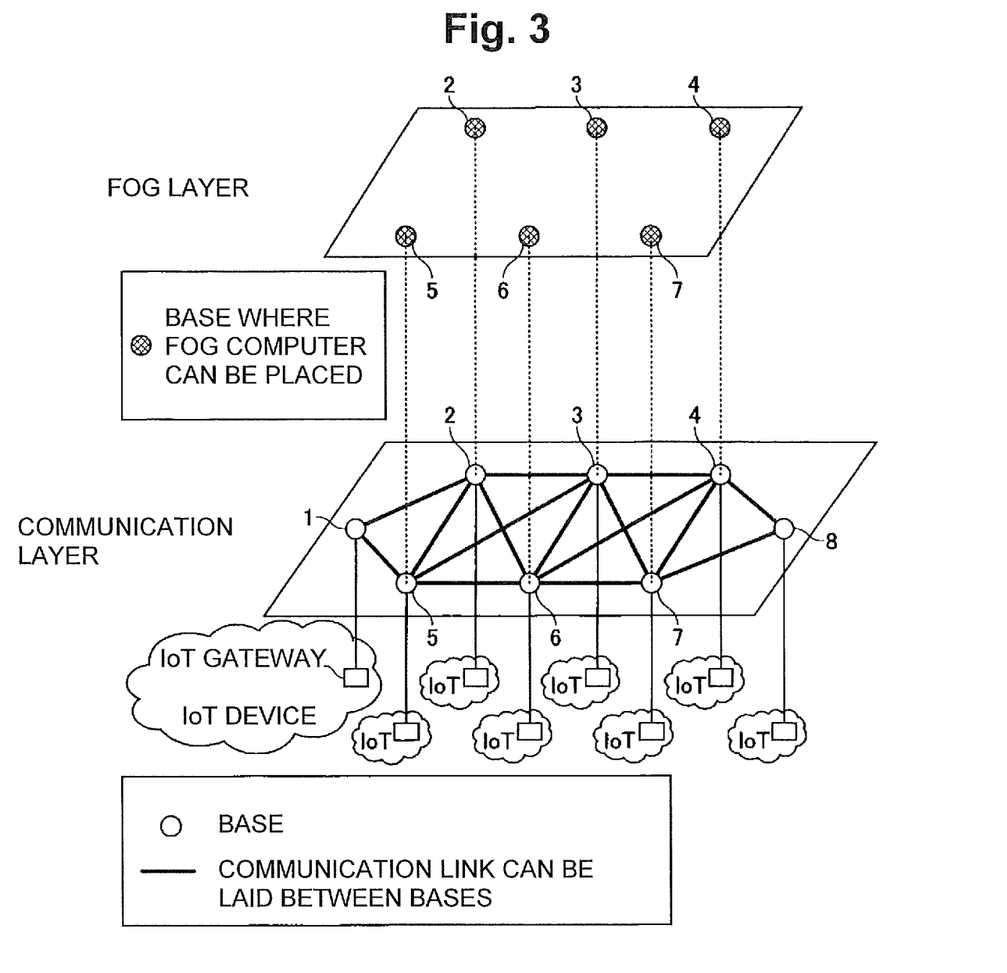
FIG. 3 is a diagram showing an example configuration of a network to be designed.

FIG. 3 is a diagram showing an example configuration of a network to be designed. As shown in FIG. 3, the network has a fog layer and a communication layer. A plurality of bases (which may also be referred to as nodes) are placed in the communication layer, and a communication link can be laid as a link between respective bases. Further, IoT gateways and IoT devices can be placed in each base.

The fog layer consists of bases where fog computers (which may also be referred to as fog servers) can be placed.

Data that is input as the network configuration condition is information on all bases, information on all links, information on bases where fog computers can be placed, and the like.

The cost condition is a fixed cost for a communication link, a variable cost factor per traffic for a communication link, a fixed cost for placing fog computers in a base, a variable cost factor per workload for fog computers, and the like.

As the demand condition, a fluctuation in demand data that is anticipated as uncertainty (uncertain demand), and a set of bases where fog computers can be assigned to demand from each node (e.g., traffic from IoT gateways, IoT devices, or the like) are input. Bases where fog computers can be assigned to demand are set based on restrictions such as delay.

Figure 4:
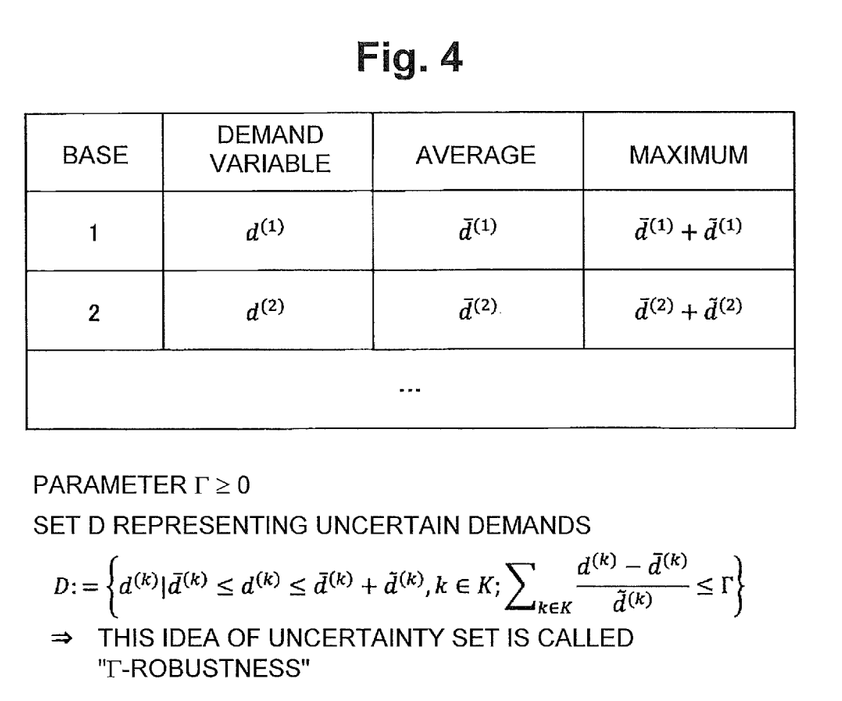
FIG. 4 is a diagram showing a demand condition.
Figure 5:
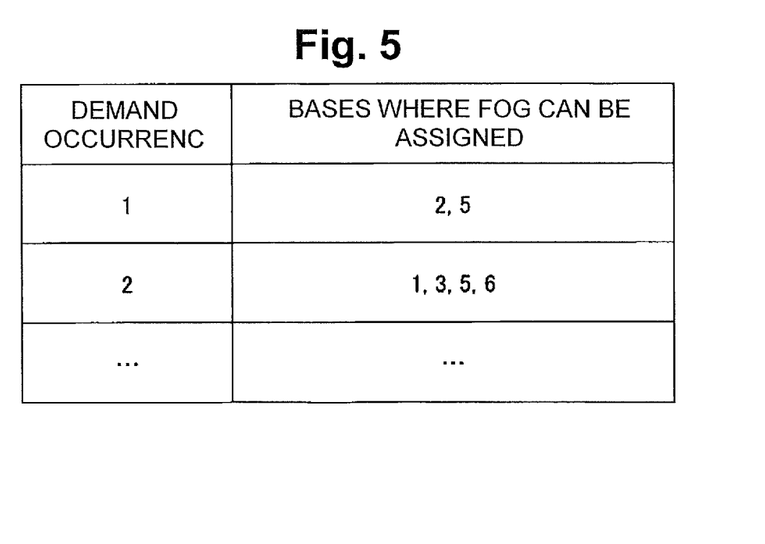
FIG. 5 is a diagram showing an example of a set of fog computers that can be assigned to demand from each node.

FIG. 4 shows an example of uncertain demands. As shown in FIG. 4, uncertain demands are given as a set D representing uncertain demands. As described in FIG. 4, this idea of an uncertain demand set is called "F-robustness". A table shown in FIG. 4 shows uncertain demand assigned to fog computers for each base, and a constraint to these uncertain demands is defined by the set D. FIG. 5 shows an example of a set of bases that can be assigned to demand from each node.

The operation unit 120 of the network design apparatus 100 determines placement and capacity of fog computers and placement and capacity of communication links in an IoT infrastructure that assume a case where the worst-case situation has occurred within the fluctuation in demand given by the demand condition, that are premised on adjustably assigning resources depending on occurred demand in the future, and that can be built with the minimum cost, and outputs them.

That is, the operation unit 120 of the network design apparatus 100 determines placement and capacity of facilities that can satisfy even any combination pattern of demands within the range of fluctuation in demand given by the demand condition, and that can be built with as low cost as possible under the cost condition. Further, the operation unit 120 determines placement and capacity of resources (at the "current" design stage) on the premise of adjustably assigning resources (fog computers and communication links) to occurred demand in the future (at a "future" assignment stage).

Before describing the content of processing by the operation unit 120 in detail, related conventional techniques will be described as references. A problem of network design under a deterministic demand condition targeted for communication links is described in Non-Patent Literature 1 as "Topological Design".

Further, as for a problem of network design only regarding communication, a design method has been considered that determines placement of communication links using an approach of robust optimization on the premise of uncertain demand (capacity design is not covered) (Non-Patent Literature 2). Further, a heuristic solution for a problem of network design has been given that is based on cooperation between content servers and communication links and targeted for deterministic demand (Non-Patent Literature 3).

Further, Non-Patent Literature 4 has disclosed a design method that is robust to uncertain demand on a condition not premised on adjustable assignment that assignment of resources to future demand is determined at the (current) design stage ("static robust design method").

The network setting apparatus 100 according to this embodiment performs capacity design and placement design based on cooperation between a plurality of layers (e.g., fog/communication) on the premise of uncertain demand and adjustable resource assignment, for which there are no consideration and analysis examples by conventional techniques.

(Detailed Operation of Network Design Apparatus 100)

The operation unit 120 of the network design apparatus 100 determines placement and capacity of fog computers and placement and capacity of communication links by solving the adjustable robust optimization problem. The points of a formulation of this optimization problem and a solution therefor are as follows. They will be described below in order as Means 1, Means 2, and Means 3.

(Means 1) A fluctuation in demand data that is anticipated as uncertainty is set, and formulation is performed based on an adjustable robust optimization method as determination of placement and capacity of an IoT infrastructure that can satisfy demand even when any demand pattern occurs within this fluctuation, and that achieve the minimum cost.

(Means 2) The formulation in (Means 1) under F-robustness is not in the normal optimization problem format as it is. Therefore, an optimization problem in the normal format that is equivalent thereto and computationally tractable ('tractable' robust counterpart) is derived. This optimization problem in the normal format (linear mixed integer programming problem) can be solved by an optimization solver. In order to solve the adjustable robust optimization problem, the operation unit 120 of the network design apparatus 100 executes an operation for solving this optimization problem in the normal format.

Although the formulation in (Means 1) uses decision variables regarding placement that are binary variables, this makes it difficult to derive a 'tractable' robust counterpart from the formulation in (Means 1). Therefore, in this embodiment, the formulated adjustable robust optimization problem is divided into two problems: a problem of determining links and fog nodes where communication links and fog computers are placed from all candidates (placement determination problem), and a problem of determining the capacity of resources at the links and the fog nodes that have been determined to be placed (capacity determination problem). Specifically, the operation unit 120 solves the placement determination problem under the condition that a solution can be found in the first step, and fixes the resulting placement to solve the capacity determination problem in the next step.

(Means 3) As to the placement determination problem in (Means 2), a determination is made by the static robust design method (Non-Patent Literature 4) that is not premised on adjustable assignment to occurred demand at the assignment stage. Alternatively, from an uncertainty set, samples thereof are drawn, and placement is determined using an optimal solution of adjustable robust design that satisfies demands of the drawn samples, based on the method described in M. J. Hadjiyiannis, P. J. Goulart and D. Kuhn, "A scenario approach for estimating the suboptimality of linear decision rules in two-stage robust optimization," 2011 50th IEEE Conference on Decision and Control and European Control Conference, pp. 7386-7391, 2011.

(Specific Processing Content)

The more specific processing content based on Means 1-3 described above is as follows.

In this embodiment, the network design apparatus 100 receives input of a configuration condition for a network having a communication layer and at least one computing layer, a cost condition for the network, and a demand condition representing uncertain demand for the network.

The network design apparatus 100 performs an operation for solving an adjustable robust optimization problem in which an objective function is to minimize a sum of a fixed cost and a variable cost for a resource placed at each base in the communication layer and the computing layer, and outputs obtained placement and capacity of a resource.

The adjustable robust optimization problem has a constraint condition using a variable indicating a ratio of, in a case where demand is assigned to a resource, a portion assigned to the resource with respect to total volume of the demand, and the variable is a variable that depends on a set of generated demands.

Note that the adjustable robust optimization problem solved by the operation unit 120 of the network design apparatus 100 is an optimization problem that is the tractable robust counterpart derived by Means 2 from the formulation in Means 1.

That is, the operation unit 120 of the network design apparatus 100 stepwisely finds solutions for the two problems obtained by division into placement determination and capacity determination in order to form a tractable robust counterpart for an adjustable robust design method for an IoT infrastructure as described as (Means 2).

Although the placement determination problem itself that is described as (Means 3) is not limited to a specific solution, the operation unit 120 of the network design apparatus 100 can solve this placement determination problem using, for example, the following methods of Option 1 and Option 2 in this embodiment.

<Option 1>

Placement is determined using a design solution determined by the static robust design method that is not on premised on adjustable assignment to occurred demand at the assignment stage. Since the static robust design method is extremely simpler than the adjustable robust design, calculation at high speed is possible. Further, although a condition for adjustable assignment is not considered, a condition for uncertain demand is considered to determine placement, so it is considered to give a design solution that approximates the adjustable robust optimization method.

<Option 2>

From an uncertain demand set, samples thereof are drawn, and placement is determined using a design solution of adjustable robust design that satisfies demands of the drawn samples. Since it is an adjustable robust design that is limited to satisfying the drawn samples, it does not the same as the original adjustable robust design that satisfies all uncertain demands, but the solution is found from an approximate problem, so the determined placement is considered to give a design solution that approximates the adjustable robust optimization method.

(Example)

A formulation of the adjustable robust optimization problem and a method for solving it will be described below in detail as an example. First, a formulation of the adjustable robust optimization problem (Means 1) will be described.

Figure 6:
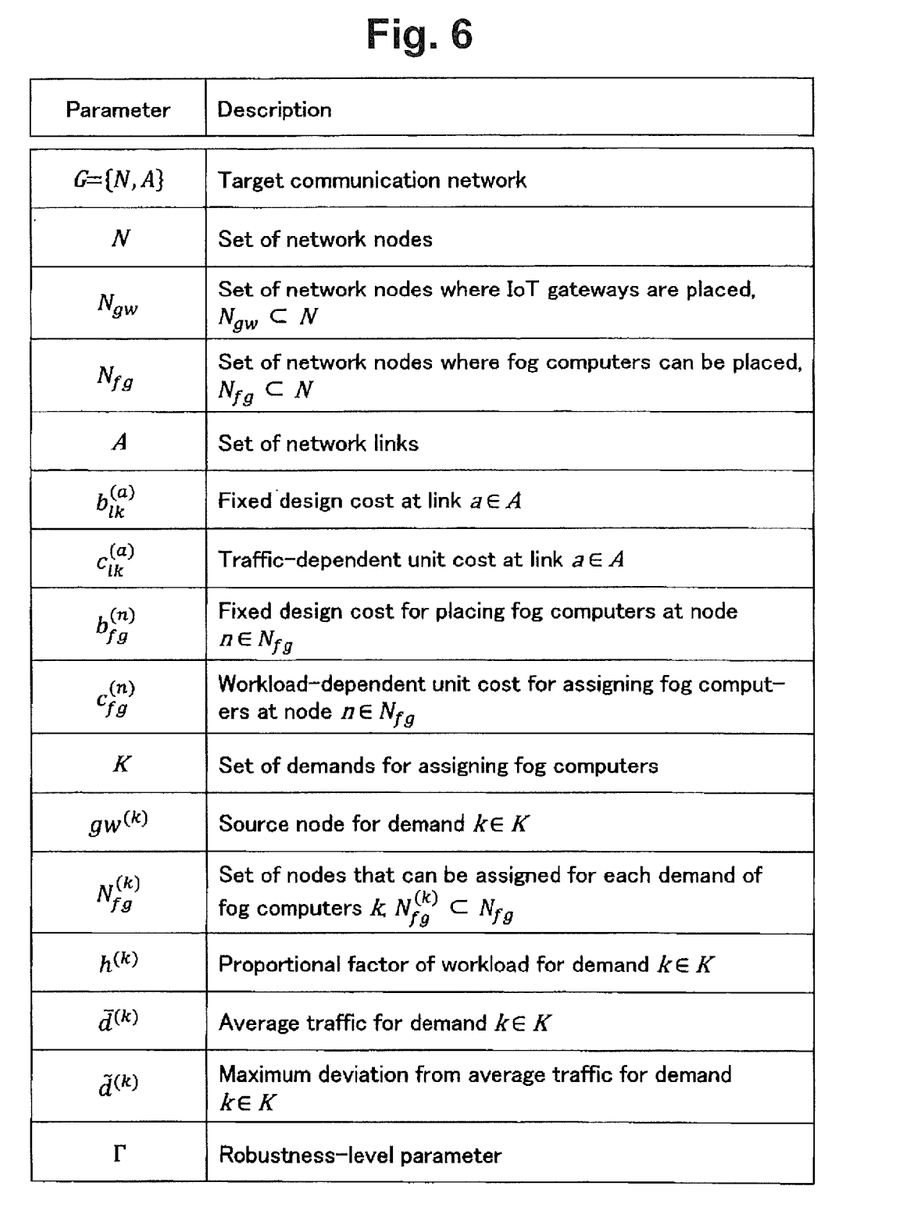
FIG. 6 is a diagram showing model parameters.
Figure 7:
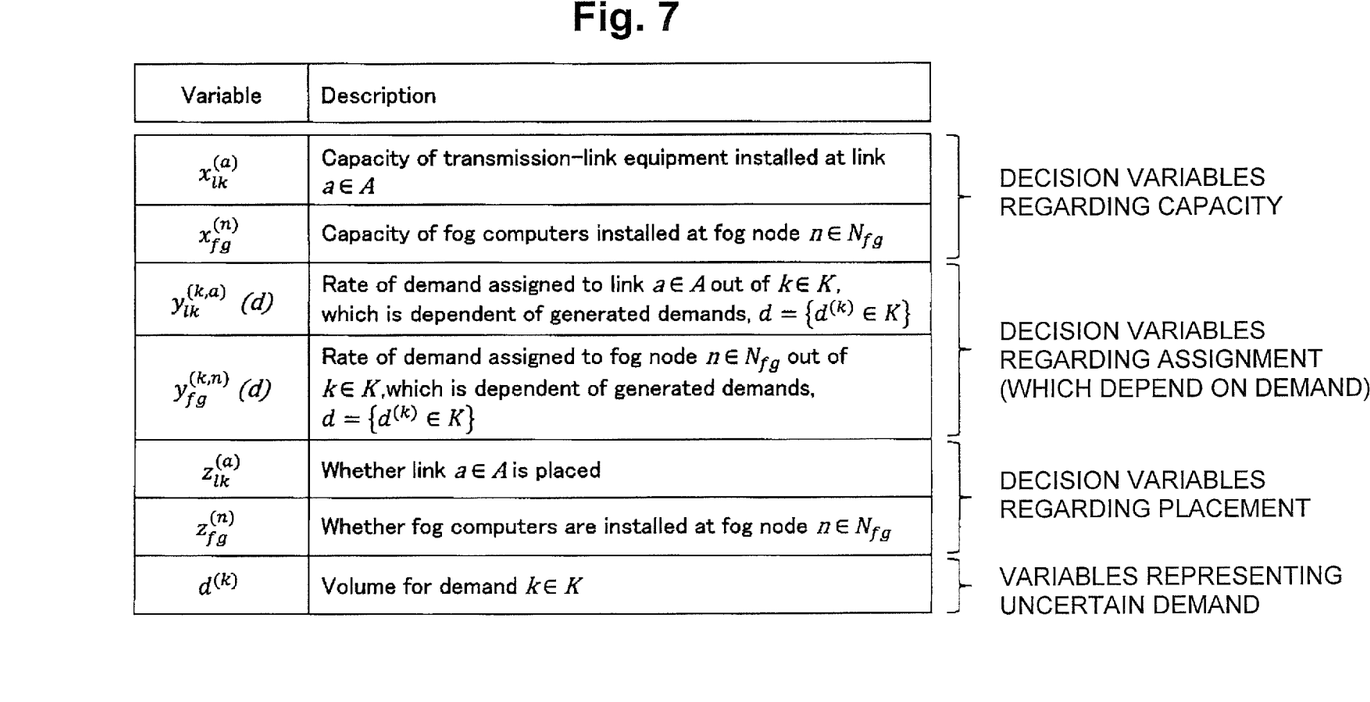
FIG. 7 is a diagram showing variables.

FIG. 6 shows model parameters used for the formulation in Means 1, and FIG. 7 shows variables used for the formulation in Means 1.

In FIG. 6, G={N, A} denotes a target network. N denotes a set of network nodes (bases). $N_{gw}$ denotes network nodes out of N where IoT gateways are installed. $Nf_g$ denotes network nodes out of N where fog computers can be installed.

'A' denotes a set of links. $b_{lk}^{(a)}$ denotes a fixed cost for link 'a'. $c_{lk}^{(a)}$ denotes a traffic-dependent unit cost for link 'a'. $b_{fg}^{(n)}$ denotes a fixed cost for placing fog computers at node n. $c_{fg}^{(n)}$ denotes a workload-dependent unit cost for assigning fog computers at node n. K denotes a set of demands for assigning fog computers.

$gw^{(k)}$ denotes a source node for demand k. $N_{fg}^{(k)}$ denotes a set of nodes that can be assigned to each demand k for fog computers. $h^{(k)}$ denotes a proportional factor of a workload for demand k. $d^{(k)}$ with a bar on the head denotes the average traffic for demand k. $d^{(k)}$ with a tilde on the head denotes the maximum deviation from the average traffic for demand k. Γ denotes a robustness-level parameter.

In FIG. 7, $x_{lk}^{(a)}$ denotes the capacity of communication link equipment installed at link 'a'. $xf_{g(n)}$ denotes the capacity of fog computers installed at fog node n.

$y_{lk}^{(k,a)}(d)$ denotes the ratio of, in the case where demand k is assigned to a link 'a', a portion assigned to the link 'a' with respect to the total volume $d^{(k)}$ of the demand, and depends on a set of generated demands d={$d^{(k)}$∈K}. Note that "d" in d={$d^{(k)}$∈K} is a vector representing the volumes of one or more generated demands. That is, d here denotes a set of demands (a set of demand volumes).

$y_{fg}^{(k,n)}(d)$ denotes the ratio of, in the case where demand k is assigned to a fog node n, a portion assigned to the fog node n with respect to the total volume d(k) of the demand, and depends on the set of generated demands d={$d^{(k)}$∈K}.

As described above, the variables that depend on the set of generated demands d={$d^{(k)}$∈K} can be used to perform wait-and-see type assignment determination based on the generated demands.

$z_{lk}^{(a)}$ denotes whether communication link equipment is installed at link 'a'. $z_{fg}^{(n)}$ denotes whether fog computers are installed at fog node n. $d^{(k)}$ denotes the volume of demand k.

<Objective Function>

Since the sum of a fixed cost associated with placement of resources such as communication links and fog computers and a variable cost depending on the capacity of installed resources is used as a cost, an objective function is:

[Math. 1]

-continued $$F(x,z) = \sum_{a \in A} b_{lk}^{(a)} z_{lk}^{(a)} + \sum_{a \in A} c_{lk}^{(a)} x_{lk}^{(a)} + \sum_{n \in N_{fg}} b_{fg}^{(n)} z_{fg}^{(n)} + \sum_{n \in N_{fg}} c_{fg}^{(n)} x_{fg}^{(n)}$$

<Demand Satisfaction Condition>

A demand satisfaction condition represents that each fog demand is assigned to fog computers installed at one of fog nodes that can be assigned, and is expressed by the following expression:

[Math. 2]

$$\sum_{n \in N_{fg}^{(k)}} y_{fg}^{(k,n)}(d) = 1, \text{ for } k \in K \qquad (1)$$

<Flow Conservation Law>

The relational expression of flow conservation on the network for fog demand is expressed as follows:

[Math. 3]

$$\sum_{a \in out(n;G)} y_{lk}^{(k,a)}(d) - \sum_{a \in in(n;G)} y_{lk}^{(k,a)}(d) = \begin{cases} -y_{fg}^{(k,n)} & \text{if } n \in N_{fg}^{(k)} \quad (2a) \\ d^{(k)} & \text{if } n = gw^{(k)} \quad (2b) \\ 0 & \text{otherwise} \quad (2c) \end{cases}$$

However, in(n; G)/out(n; G) ⊂ A in the above expression denotes a set of links that enters/exits n∈N on G, respectively.

<Capacity Constraint>

Traffic flowing through a communication link and a workload assigned at a fog node are restricted by the capacity of the link and the base, and the restriction is expressed by the following expressions:

[Math. 4]

$$\sum_{k \in K} y_{lk}^{(k,a)}(d) \leq x_{lk}^{(a)}, \text{ for } a \in A \qquad (3a)$$

$$\sum_{k \in K} h^{(k)} y_{fg}^{(k,n)}(d) \leq x_{fg}^{(n)}, \text{ for } n \in N_{fg} \qquad (3b)$$

<Placement Constraint>

A placement constraint is a condition that resources such as communication links or fog computers need to be placed when even a little traffic or workload is assigned to a link or a fog node, and is expressed by the following constraint expressions:

[Math. 5]

$$x_{lk}^{(a)} \leq M z_{lk}^{(a)}, \text{ for } a \in A \qquad (4a)$$

$$x_{fg}^{(n)} \leq M z_{fg}^{(n)}, \text{ for } n \in N_{fg} \qquad (4b)$$

The above constraint expressions are based on the big-M method, and the parameter M needs to be a sufficiently large value so that the constraint expressions necessarily hold when z=1.

<Decision Variable Definitions>

From the definitions of the decision variables, they have the following constraints:

[Math. 6]

$$x \geq 0, y(d) \geq 0, z \in \{0,1\} \quad (5)$$

Thus, the robust design problem for an IoT infrastructure is modeled as the following adjustable robust optimization problem P(A; N; $N_{fg}$) for calculating the minimum cost that is guaranteed for any demand pattern in the uncertain demand set D. Note that $\Delta$ is a set of uncertain demands.

[Math. 7]

$$\min : F(x,z) \text{ s.t.}: \forall d \in \Delta : \exists y(d): \{x, y(d), z\} \text{ satisfies (1)-(5).}$$

Next, a method to derive a tractable robust counterpart will be described that uses division of the above adjustable robust optimization problem P(A; N; $N_{fg}$) into a placement determination problem and a capacity determination problem described as Means 2 and the scheme described as Means 3.

The first placement determination problem is solved as the following static robust optimization problem $P_{SRP}$ (A; N; $N_{fg}$) that is not premised on adjustable assignment to occurred demand:

[Math. 8]

$$\min : F(x,z) \text{ s.t.}: \forall d \in \Delta : \exists y: \{x, y, z\} \text{ satisfies satisfies (1)-(5).}$$

Note that a condition for assignment determination that does not depend on occurred demand is here realized by the following variable conversion for P(A; N; $N_{fg}$):

$$y_{lk}^{(k,a)}(d) \to y_{lk}^{(k,a)}, \text{for} k \in K, a \in A$$

[Math. 9]

$$y_{fg}^{(k,n)}(d) \to y_{fg}^{(k,n)}, \text{for} k \in K, n \in A$$

That is, $y_{lk}^{(k,a)}(d)$ and $y_{fg}^{(k,n)}(d)$ used in the constraints (1)-(5) described before are replaced with $y_{lk}^{(k,a)}$ and $y_{fg}^{(k,n)}$ in $P_{SRP}$(A; N; $N_{fg}$). Further, $y \in \{0, 1\}$ here.

The operation unit 120 solves this static robust optimization problem $P_{SRP}$(A; N; $N_{fg}$) using, for example, the method disclosed in Non-Patent Literature 4.

Sets of links and fog nodes that have been determined to be placed by solving the static robust optimization problem $P_{SRP}$ (A; N; $N_{fg}$) are expressed as:

[Math. 10]

$$\hat{A} = \{a | z_{lk}^{(a)} = 1, a \in A\}, \hat{N}_{fg} = \{n | z_{fg}^{(n)} = 1, n \in N_{fg}\}$$

For capacity determination on the network:

[Math. 11]

$$\hat{G} = \{\hat{N}, \hat{A}\}$$

based on the determined placement, the operation unit 120 solves an adjustable robust optimization problem:

[Math. 12]

$$P_{ARC}(\hat{A}; \hat{N}; \hat{N}_{fg})$$

The above adjustable robust optimization problem can be formulated as follows:

[Math. 13]

$$\min : \sum_{a \in \hat{A}} b_{lk}^{(a)} + \sum_{n \in \hat{N}_{fg}} b_{fg}^{(n)} + \sum_{a \in \hat{A}} c_{lk}^{(a)} x_{lk}^{(a)} + \sum_{n \in \hat{N}_{fg}} c_{fg}^{(n)} x_{fg}^{(n)} \text{ s.t. :}$$

$$\forall d \in \Delta : \exists y(d): \{x, y(d)\} \text{ satisfies } (6) - (9).$$

[Math. 14]

$$\sum_{n \in \hat{N}_{fg}^{(k)}} y_{fg}^{(k,n)}(d) = 1, \text{ for } k \in K \quad (6)$$

[Math. 15]

$$\sum_{a \in out(n;\hat{G})} y_{lk}^{(k,a)}(d) - \sum_{a \in in(n;\hat{G})} y_{lk}^{(k,a)}(d) =$$

$$\begin{cases} -y_{fg}^{(k,n)} & \text{if } n \in N_{fg}^{(k)} \cap \hat{N}_{fg} \quad (7a) \\ d^{(k)} & \text{if } n = gww^{(k)} \quad (7b) \\ 0 & \text{otherwise,} \quad (7c) \end{cases} \text{ for } n \in \hat{N}, k \in K$$

[Math. 16]

$$\sum_{k \in K} y_{lk}^{(k,a)}(d) \leq x_{lk}^{(a)}, \text{ for } a \in \hat{A} \quad (8a)$$

$$\sum_{k \in K} h^{(k)} y_{fg}^{(k,n)}(d) \leq x_{fg}^{(n)}, \text{ for } n \in \hat{N}_{fg} \quad (8b)$$

[Math. 17]

$$x \geq 0, y(d) \geq 0 \quad (9)$$

The operation unit 120 can solve the above problem using, for example, the method of efficiently finding a sub-optimal solution that is disclosed in A. Ben-Tal, A. Goryashko, E. Guslitzer, and A. Nemirovski, "Adjustable robust solutions of uncertain linear programs," Mathematical Programming, vol. 99, no. 2, pp. 351-376, 2004.

Note that the constraints in (6), (7), (8), and (9) are a demand satisfaction condition, a flow conservation law, a capacity constraint, and decision variable definitions that are similar to those in (1), (2), (3), and (5), which have already been described.

EVALUATION EXAMPLE

Ten networks were generated as cases for evaluation using the Watts-Strogatz method in which the number of nodes is 20, the mean degree is 4, and the rewiring rate is 0.1. For each case, robust designs with different is were implemented, and evaluation was performed.

Network design was performed using the "proposed method" (which determines placement using Option 1 for Means 3) and a "comparison method" (which determines placement that satisfies the average demand with the minimum cost). In both cases, capacity determination was performed using adjustable robust design.

The optimality of the obtained solution was evaluated using the ratio of a deviation between the cost (dc) of the design solution derived by each design method (the proposed method and the comparison method) and a lower bound (ub) with respect to the lower bound ("deviation ratio"=(dc−lb)/lb).

Figure 8:
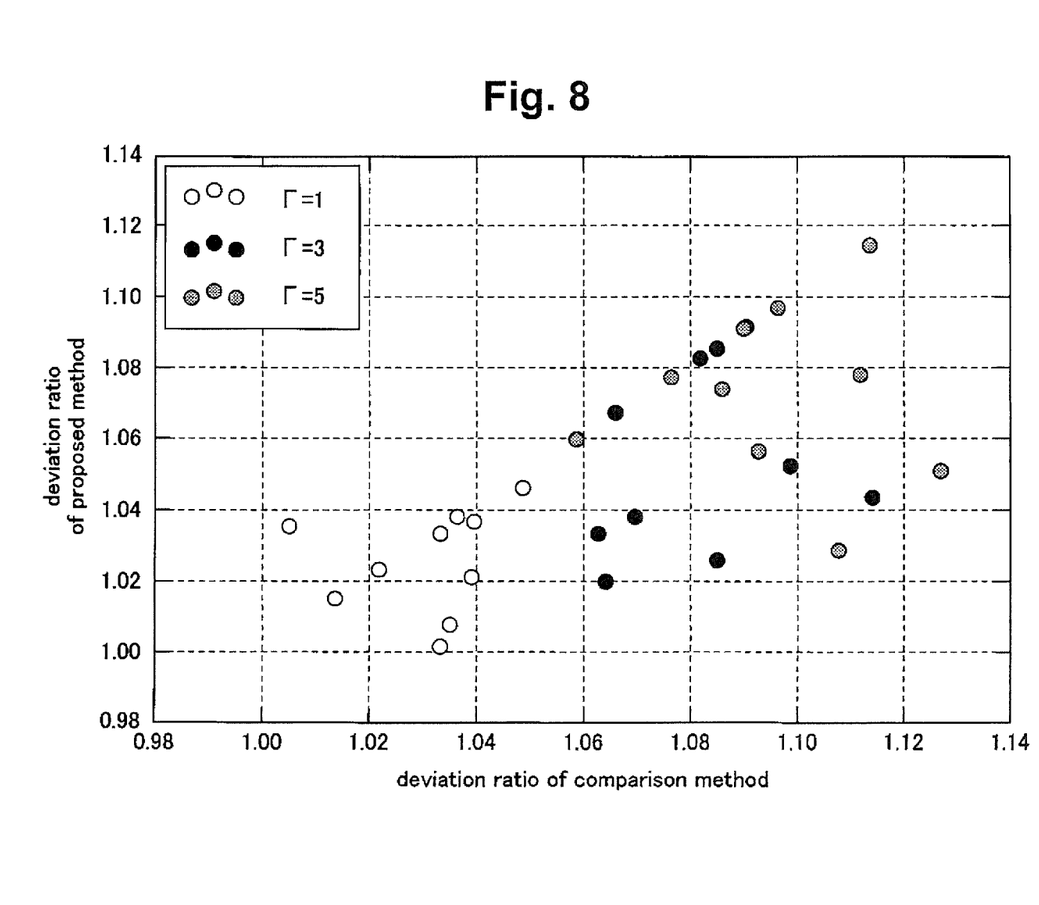
FIG. 8 is a diagram showing an evaluation example.

The evaluation result is shown in FIG. 8. The horizontal axis in FIG. 8 represents the deviation ratio of the comparison method, the vertical axis represents the deviation ratio of the proposed method, and a design result for each Γ in each case for evaluation is plotted.

As shown in FIG. 8, there are more cases plotted in the lower right area, and it can be seen that the proposed method derives values closer to the optimum value than the comparison method.

Regarding Effects of Embodiment

The technique according to this embodiment described above can determine placement and capacity of resources that are premised on adjustable assignment to future demand, that can satisfy even any demand that occurs within the range of fluctuation in demand defined by Γ-robustness, and that can be built with a cost close to the minimum cost.

Further, although it does not find a design solution with the minimum cost, it can derive a desired placement and capacity close to the minimum cost in a relatively short calculation time.

Summary of Embodiment

This embodiment provides at least a network design apparatus, a network design method, and a program described in each clause below.

(Clause 1)

A network design apparatus for designing a network, comprising:
- an input unit that receives input of a configuration condition for a network having a communication layer and at least one computing layer, a cost condition for the network, and a demand condition representing uncertain demand for the network;
- an operation unit that performs an operation for solving an adjustable robust optimization problem in which an objective function is to minimize a sum of a fixed cost and a variable cost for a resource placed at each base in the communication layer and the computing layer; and
- an output unit that outputs placement and capacity of a resource obtained by the operation unit,
- wherein the adjustable robust optimization problem has a constraint condition using a variable indicating a ratio of, in a case where demand is assigned to a resource, a portion assigned to the resource with respect to total volume of the demand, and the variable is a variable that depends on a set of generated demands.

(Clause 2)

A network design apparatus for designing a network, comprising:
- an input unit that receives input of a configuration condition for a network having a communication layer and at least one computing layer, a cost condition for the network, and a demand condition representing uncertain demand for the network;
- an operation unit that performs an operation for solving an adjustable robust optimization problem in which an objective function is to minimize a sum of a fixed cost and a variable cost for a communication link and a computer that are placed at each base in the communication layer and the computing layer, a demand satisfaction condition is that demand for each computer is satisfied, a flow conservation condition is that a flow of traffic for demand for each computer is conserved, and a capacity constraint is a constraint due to capacity of a communication link and a computer at each base; and
- an output unit that outputs placement and capacity of each of a communication link and a computer obtained by the operation unit,
- wherein the demand satisfaction condition is represented by a first variable that indicates a ratio of, in a case where demand is assigned to a node, a portion assigned to the node with respect to total volume of the demand, and depends on a set of generated demands, and
- each of the flow conservation condition and the capacity constraint is represented by
- the first variable, and
- a second variable that indicates a ratio of, in a case where demand is assigned to a link, a portion assigned to the link with respect to total volume of the demand, and depends on a set of generated demands.

(Clause 3)

The network design apparatus according to clause 2, wherein
- the operation unit solves the adjustable robust optimization problem by solving a placement determination problem for determining placement of the communication link and the computer to determine the placement, and then solving a capacity determination problem for determining capacity of the communication link and the computer.

(Clause 4)

The network design apparatus according to clause 3, wherein
- the operation unit solves the placement determination problem as a static robust optimization problem.

(Clause 5)

The network design apparatus according to clause 3, wherein
- the operation unit solves the placement determination problem as an adjustable robust optimization problem of satisfying demand of a sample drawn from an uncertain demand set.

(Clause 6)

A network design method executed by a network design apparatus for designing a network, comprising:
- an input step of receiving input of a configuration condition for a network having a communication layer and at least one computing layer, a cost condition for the network, and a demand condition representing uncertain demand for the network;
- an operation step of performing an operation for solving an adjustable robust optimization problem in which an objective function is to minimize a sum of a fixed cost and a variable cost for a resource placed at each base in the communication layer and the computing layer; and
- an output step of outputting placement and capacity of a resource obtained by the operation step,
- wherein the adjustable robust optimization problem has a constraint condition using a variable indicating a ratio of, in a case where demand is assigned to a resource, a portion assigned to the resource with respect to total volume of the demand, and the variable is a variable that depends on a set of generated demands.

(Clause 7)

A program for causing a computer to function as each unit of the network design apparatus according to any one of clauses 1 to 3.

Although this embodiment has been described above, the present invention is not limited to such a specific embodiment, and various variants and modifications can be made within the scope of the gist of the present invention described in Claims.

REFERENCE SIGNS LIST

100 Network design apparatus
110 Input unit
120 Operation unit
130 Data storage unit
140 Output unit
1000 Drive device
1001 Recording medium
1002 Auxiliary storage device
1003 Memory device
1004 CPU 1005 Interface device
1006 Display device
1007 Input device

The invention claimed is:

1. A network design apparatus for designing a network, comprising:
a processor; and
a memory storing program instructions that cause the processor to:
receive input of a configuration condition for a network having a communication layer and at least one computing layer, a cost condition for the network, and a demand condition representing uncertain demand for the network, the network including a plurality of bases;
perform an operation for solving an adjustable robust optimization problem in which an objective function is to minimize a sum of a fixed cost and a variable cost for a resource placed at each base in the communication layer and the computing layer; and
determine a configuration of the network based on placement and capacity of a resource obtained by the performing of the operation,
wherein the adjustable robust optimization problem has a constraint condition using a variable indicating a ratio of, in a case where demand is assigned to a resource, a portion assigned to the resource with respect to total volume of the demand, and the variable is a variable that depends on a set of generated demands, and
wherein the demand condition includes a set of one or more bases among the plurality of bases, the one or more bases being associated with a first base among the plurality of bases, and resources placed at the one or more bases being assignable to the first base in response to the demand at the first base.

2. A network design apparatus for designing a network, comprising:
a processor; and
a memory storing program instructions that cause the processor to:
receive input of a configuration condition for a network having a communication layer and at least one computing layer, a cost condition for the network, and a demand condition representing uncertain demand for the network, the network including a plurality of bases;
perform an operation for solving an adjustable robust optimization problem in which an objective function is to minimize a sum of a fixed cost and a variable cost for a communication link and a computer that are placed at each base in the communication layer and the computing layer, a demand satisfaction condition is that demand for each computer is satisfied, a flow conservation condition is that a flow of traffic for demand for each computer is conserved, and a capacity constraint is a constraint due to capacity of a communication link and a computer at each base; and
determine a configuration of the network based on placement and capacity of each of a communication link and a computer obtained by the performing of the operation,
wherein the demand satisfaction condition is represented by a first variable that indicates a ratio of, in a case where demand is assigned to a node, a portion assigned to the node with respect to total volume of the demand, and depends on a set of generated demands, and each of the flow conservation condition and the capacity constraint is represented by the first variable, and
a second variable that indicates a ratio of, in a case where demand is assigned to a link, a portion assigned to the link with respect to total volume of the demand, and depends on a set of generated demands, and
wherein the demand condition includes a set of one or more bases among the plurality of bases, the one or more bases being associated with a first base among the plurality of bases, and computers placed at the one or more bases being assignable to the first base in response to the demand at the first base.

3. The network design apparatus according to claim 2, wherein
the performing of the operation includes solving the adjustable robust optimization problem by solving a placement determination problem for determining placement of the communication link and the computer to determine the placement, and then solving a capacity determination problem for determining capacity of the communication link and the computer.

4. The network design apparatus according to claim 3, wherein
the performing of the operation includes solving the placement determination problem as a static robust optimization problem.

5. The network design apparatus according to claim 3, wherein
the performing of the operation includes solving the placement determination problem as an adjustable robust optimization problem of satisfying demand of a sample drawn from an uncertain demand set.

6. A network design method executed by a network design apparatus for designing a network, comprising:
receiving input of a configuration condition for a network having a communication layer and at least one computing layer, a cost condition for the network, and a demand condition representing uncertain demand for the network, the network including a plurality of bases;
performing an operation for solving an adjustable robust optimization problem in which an objective function is to minimize a sum of a fixed cost and a variable cost for a resource placed at each base in the communication layer and the computing layer; and
determining a configuration of the network based on placement and capacity of a resource obtained by the performing of the operation,
wherein the adjustable robust optimization problem has a constraint condition using a variable indicating a ratio of, in a case where demand is assigned to a resource, a portion assigned to the resource with respect to total volume of the demand, and the variable is a variable that depends on a set of generated demands, and
wherein the demand condition includes a set of one or more bases among the plurality of bases, the one or more bases being associated with a first base among the plurality of bases, and resources placed at the one or more bases being assignable to the first base in response to the demand at the first base.

7. A non-transitory computer-readable storage medium that stores therein a program for causing a computer to perform the network design method according to claim 6.

8. The network design apparatus according to claim 1, wherein the set of one or more bases in the demand condition is set for the demand at each base.

9. The network design apparatus according to claim 8, wherein the resource is a computer.

10. The network design apparatus according to claim 9, wherein the set of one or more bases in the demand condition is set based on restriction of delay.

11. The network design apparatus according to claim 1,
wherein the configuration of the network is determined to satisfy all combination patterns of demands under the demand condition at a minimum cost, and
wherein a different pattern of demand is assigned to a different base among the plurality of bases in the network.

12. The network design apparatus according to claim 1,
wherein the configuration of the network is determined to satisfy all combination patterns of demands under the demand condition at a minimum cost, and
wherein the all combination patterns of demands are generated within a range of fluctuations of the uncertain demand.

13. The network design apparatus according to claim 11,
wherein the configuration of the network is determined based on a premise that at least one of the resources placed at the one or more bases is assigned to the first base in response to the demand at the first base.

14. The network design apparatus according to claim 12,
wherein the configuration of the network is determined based on a premise that at least one of the resources placed at the one or more bases is assigned to the first base in response to the demand at the first base.

* * * * *